G. B. FOUTS.
TROLLEY WHEEL GUARD.
APPLICATION FILED MAY 5, 1915.
1,192,051.
Patented July 25, 1916.
2 SHEETS—SHEET 1.
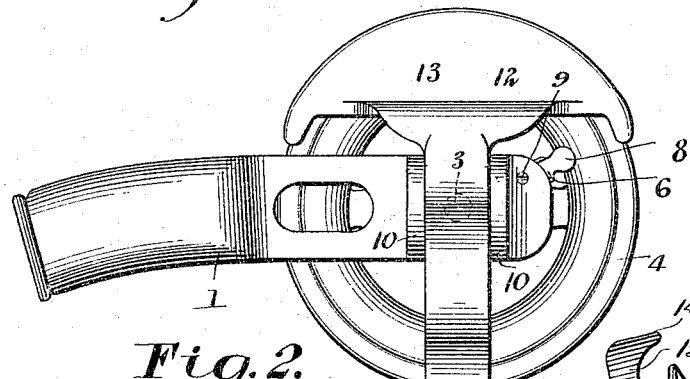
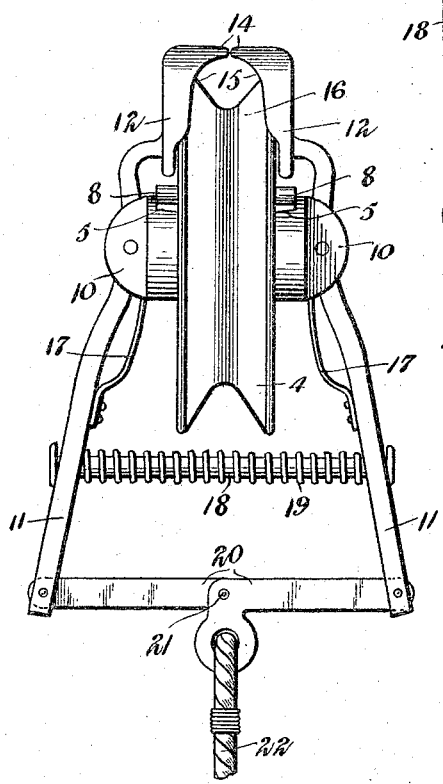
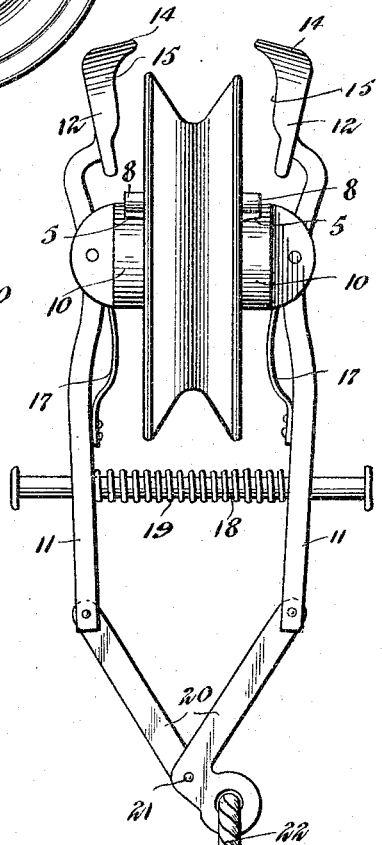
Witnesses
Frederick W. Ely
John J. McCarthy
Inventor
George B. Fouts,
By Victor J. Evans
Attorney G. B. FOUTS.
TROLLEY WHEEL GUARD.
APPLICATION FILED MAY 5, 1915.
1,192,051.
Patented July 25, 1916.
2 SHEETS—SHEET 2.
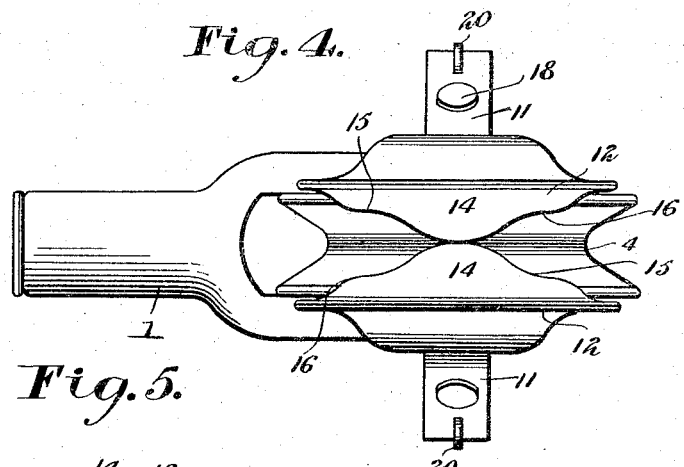
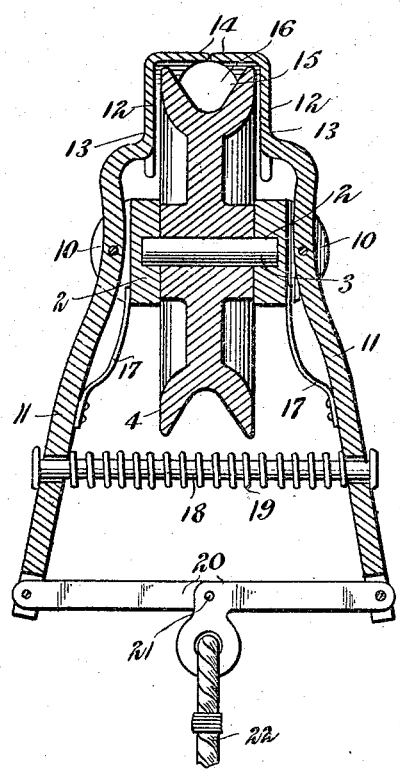
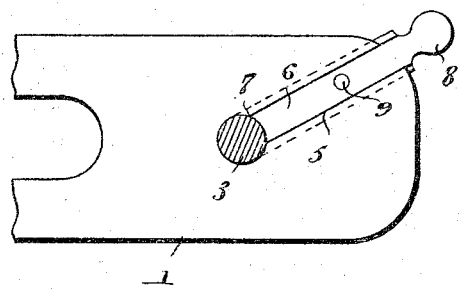
Witnesses
Frederick W. Ely
John J. McCarty
Inventor
George B. Fouts,
By Victor J. Evans
Attorney

UNITED STATES PATENT OFFICE.

GEORGE B. FOUTS, OF ALLIANCE, OHIO.

TROLLEY-WHEEL GUARD.

1,192,051.  Specification of Letters Patent.  Patented July 25, 1916.

Application filed May 5, 1915. Serial No. 26,035.

*To all whom it may concern:*

Be it known that I, GEORGE B. FOUTS, a citizen of the United States, residing at Alliance, in the county of Stark and State of Ohio, have invented new and useful Improvements in Trolley-Wheel Guards, of which the following is a specification.

This invention relates to improvements in guards for trolley wheels and has particular application to a device for holding the trolley wheel in engagement with the wire.

In carrying out the present invention it is my purpose to improve and simplify the general construction of trolley wheel guards and to provide a guard which will operate efficiently and effectively to hold the wheel on the wire and which will open up automatically when passing a trolley wire supporting clamp, switch plate or the like to enable the wheel to pass such clamp or plate easily and without any unnecessary strain or pull on the parts.

It is also my purpose to provide a trolley harp which will be constructed in such manner that the trolley wheel and axle may be readily and quickly removed from the harp when it is desired to replace the wheel.

With the above recited objects in view, and others of a like nature, the invention consists in the construction, combination and arrangement of parts set forth in and falling within the scope of the appended claim.

In the accompanying drawings: Figure 1 is a view in side elevation of the trolley wheel harp and trolley wheel therein equipped with a guard constructed in accordance with the present invention. Fig. 2 is an end elevation of the same. Fig. 3 is a similar view showing the jaws of the guard in open position. Fig. 4 is a top plan view. Fig. 5 is a vertical transverse sectional view. Fig. 6 is an enlarged fragmentary longitudinally sectional view showing the means for holding the trolley wheel in the harp.

Referring now to the drawings in detail 1 designates a trolley wheel harp having the inner surfaces of the limbs thereof formed with horizontal alining openings 2 designed to receive the respective ends of the axle 3 of the trolley wheel 4. In accordance with my present invention, the confronting surfaces of the limbs of the harp 1 are formed with ways or grooves 5, respectively. The inner end of each way 5 opens into a particular bearing opening 2 while the outer end of the way opens onto the upper end edge of the limb of the harp, and, in the present instance, the ways 5 are dove-tailed in cross section. Slidably mounted in each way 5 is a securing block 6 of a cross sectional configuration corresponding to that of the way and having the inner end thereof concaved as at 7 to form a portion of the wall of the bearing opening, and the outer end projected beyond the corresponding end of the way and formed to provide a handle 8. Passed through the bottom walls of the ways and threaded into the adjacent portions of the blocks 6 are securing screws 9 respectively whereby the blocks are held securely within the ways.

When it is desired to remove the trolley wheel and axle from the harp, as when it is necessary to replace a worn wheel, the screws 9 are removed and the blocks 6 slid out of the respective ways under the action of the handles 8. The ends of the axle 3 may now be slid through the ways and the trolley wheel detached from the harp.

Formed on the outer surfaces of the respective limbs of the harp 1 are pairs of lugs 10 and pivoted between the lugs of the respective pairs are levers 11 having the lower ends thereof projecting below the periphery of the trolley wheel and the upper ends terminating a short distance above the top edges of the limbs of the harp. Fastened to the upper ends of the limbs 11 are jaws 12 respectively. Each jaw 12 comprises a segmental side wall 13 disposed adjacent to the side of the trolley wheel, and a curved flange 14 formed integral with the upper curved edge of the side wall 13 and overlying the periphery of the trolley wheel. The flanges 14 of the jaws 12 project toward each other and the confronting edges thereof, at the opposite sides of the central portions, are cut away as at 15 to provide tapering entrance mouths 16, while the central portions of the flanges are disposed in close proximity to each other. Leaf springs 17 have the lower extremities secured to the inner surfaces of the respective levers 11 below the pivot points of such levers and the upper ends bearing against the outer surfaces of the limbs of the harp. Passed through alining openings in the levers is a rod 18 and surrounding the rod 18 is a coiled expansion spring 19 having the ends thereof abutting the inner surfaces of the levers. This spring 19 and rod 18 are disposed adjacent to the lower ends of the levers and the spring 19 coacts with the leaf springs 17 to hold the jaws 12 on the upper ends of the levers normally in active position, that is, in position to overlie the trolley wire in the groove of the trolley wheel so as to maintain the trolley wheel in engagement with the wire under all conditions. Links 20 have the outer ends thereof pivotally connected with the lower extremities of the levers 11, respectively, and the inner ends thereof pivotally connected to each other as at 21 and connected with the inner end of one of the links 20 and depending therefrom is a rope 22.

In practice, the springs hold the jaws normally in active position, as previously described, whereby the trolley wheel is held in engagement with the wire. When the trolley wheel passes a clamp, switch plate or analogous support, the confronting edges of the flanges 14 of the jaws gradually engage such support and so swing the jaws to opened position against the action of the springs, as illustrated in Fig. 3 of the drawing, thereby enabling the trolley wheel to pass the support without placing unnecessary strain on the parts. When it is desired to lower the trolley wheel, the rope 22 is pulled and in the initial pulling of the rope, the links 22 are swung with the effect to swing the levers against the action of the springs, and so separate the jaws, and in the continued pulling of the rope, the trolley wheel is lowered.

While I have herein shown and described one particular form of my invention, by way of illustration, I wish it to be understood that I do not limit or confine myself to the precise details of construction herein described and delineated, as modification and variation may be made within the scope of the claim and without departing from the spirit of the invention.

What is claimed is:—

The combination with a trolley wheel harp, of a guard comprising levers pivoted to the respective limbs of the harp, jaws carried by the upper ends of said levers respectively, each jaw comprising a segmental side wall with its upper edge curved in an arc parallel with the periphery of the wheel and a curved flange formed integral with the curved upper edge of said side wall, and overlying the periphery of the trolley wheel, the confronting edges of the flanges of said jaws being cut away at the opposite sides of the central portions to provide entrance mouths, and means acting upon the lower ends of said levers to hold said jaws normally in active position.

In testimony whereof I affix my signature in presence of two witnesses.

GEORGE B. FOUTS.

Witnesses:
LOUIS G. IRWIN,
C. C. CLUEY.

Copies of this patent may be obtained for five cents each, by addressing the "Commissioner of Patents, Washington, D. C."